United States Patent
Hanson et al.

(10) Patent No.: US 6,553,509 B1
(45) Date of Patent: Apr. 22, 2003

(54) LOG RECORD PARSING FOR A DISTRIBUTED LOG ON A DISK ARRAY DATA STORAGE SYSTEM

(75) Inventors: Kirk A. Hanson, Eagle, ID (US); Douglas L. Voigt, Boise, ID (US); Don L. Burkes, Meridian, ID (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/363,917

(22) Filed: Jul. 28, 1999

(51) Int. Cl.$^7$ .................................................. H02H 3/05
(52) U.S. Cl. ................................................ 714/5; 714/20
(58) Field of Search .............................. 714/5, 7, 8, 15, 714/16, 20, 43, 54, 19, 718; 711/114

(56) References Cited

U.S. PATENT DOCUMENTS

| | | | |
|---|---|---|---|
| 5,072,378 A | * 12/1991 | Manka | 714/6 |
| 5,113,499 A | * 5/1992 | Ankney et al. | 340/825.34 |
| 5,381,545 A | * 1/1995 | Baker et al. | 714/19 |
| 5,455,946 A | * 10/1995 | Mohan et al. | 707/202 |
| 5,630,124 A | * 5/1997 | Coyle, Jr. et al. | 707/103 |
| 6,055,604 A | * 4/2000 | Voigt et al. | 711/117 |
| 6,185,663 B1 | * 2/2001 | Burke | 711/156 |

* cited by examiner

*Primary Examiner*—Dieu-Minh Le

(57) ABSTRACT

A storage system maintains a log image consisting of log records kept in a page log and log records kept in a distributed log kept in staging buffers of multiple storage media. The distributed log contains incremental log records that are occasionally forced to the storage media prior to filling an entire page of log records. The storage system has a log recovery manager that recovers the log image following a failure. The log recovery manager first reads the log records from the page log to reproduce a majority of the log image. The log recovery manager then scans the distributed log to locate any more recent log records that may exist. Once a more recent log record is found, the log recovery manager adds it to the recaptured log image and proceeds to find even more recent log records. To speed the recovery, the log recovery manager intelligently begins the search for the next incremental log record at a location in the storage system that the next log record is likely to reside. The log recovery manager begins looking for the next log record using three criteria: (1) it looks on the same storage medium that contains the previous log record just found; (2) it looks in the other staging buffer on the storage medium; and (3) it begins at an offset equal to the length of the previous log record just found.

15 Claims, 8 Drawing Sheets

LOG RECORD PARSING FOR A DISTRIBUTED LOG ON A DISK ARRAY DATA STORAGE SYSTEM

FIELD OF THE INVENTION

This invention relates in general to data storage systems and, more particularly, to transaction log management for disk array storage systems and techniques for recovering transaction logs.

BACKGROUND OF THE INVENTION

Computer systems are constantly improving in terms of speed, reliability, and processing capability. As a result, computers are able to handle more complex and sophisticated applications. As computers improve, performance demands placed on mass storage and input/output (I/O) devices increase. Thus, there is a continuing need to design mass storage systems that keep pace in terms of performance with evolving computer systems.

This invention particularly concerns mass storage systems of the disk array type. Disk array data storage systems have multiple storage disk drive devices, which are arranged and coordinated to form a single mass storage system. There are three primary design criteria for mass storage systems: cost, performance, and availability. It is most desirable to produce memory devices that have a low cost per megabyte, a high input/output performance, and high data availability. "Availability" is the ability to access data stored in the storage system and the ability to insure continued operation in the event of some failure. Typically, data availability is provided through the use of redundancy wherein data, or relationships among data, are stored in multiple locations. Two common methods of storing redundant data are the "mirror" and "parity" methods.

One problem encountered in the design of disk array data storage systems concerns the issue of retaining accurate mapping information of the data in store in the event of a system error or failure. This is true for systems that employ either one or both methods of storing redundant data. Thus, in the course of managing disk array mapping information, it is often necessary to insure that recently changed mapping information is stored on disk for error recovery purposes. This disk write requirement may occur for several reasons, such as (i) a time based frequency status update, (ii) a log page full status, or (iii) a specific host request.

Generally, recent changes are accumulated at random locations in data structures that are optimized for performance of the disk array function and, in addition, are accumulated sequentially in a log which can be written to disk (posted) more quickly than the other data structures. This technique is common in the art of transaction processing. Disadvantageously, however, the posting requirement may occur concurrently with other ongoing disk read or write activity thereby creating I/O contention in the system. Such I/O contention often extracts a significant performance hit on the system, especially if the posting occurs frequently, because multiple I/O events must occur for a single posting of the log to disk. For example, typically, the log page is first marked as invalid (i.e., it needs to be updated). Then, the log page is copied to disk and subsequently marked valid. Finally, in a redundant system, the redundant log page is copied to disk.

In view of the forgoing, and of the ever increasing computing speeds offered and massive amounts of information being managed, there is a constant need for improved performance in disk array systems and particularly in the recovery of such disk array systems.

SUMMARY OF THE INVENTION

This invention concerns transaction logging for a data storage system and methods for recovering log records following a system failure. The storage system has a main memory to hold a log image. The log image consists of multiple log records, with each log record being assigned a monotonically increasing sequence number that tracks the order in which the log records are written to the log image. The sequence numbers provide an indication of how recently the log records are written to the log image.

The storage system has multiple storage media (e.g., disks) connected to the main memory. The storage media have a reserved area made up of at least two staging buffers on each medium. In the described implementation, there is one even and one odd staging buffer on each storage medium.

The log image consists of log records kept in a page log and in a distributed log. The page log is stored on the storage media and holds entire pages of log records from the log image. As a page in the log image is filled with log records, the page is flushed to the page log. The distributed log is distributed over the storage media and resides in the staging buffers. In contrast to the page log, the distributed log contains incremental log records that are occasionally forced to the storage media prior to filling an entire page of log records. The incremental log records are written to a least busy storage medium in an alternating pattern between the two staging buffers. The distributed log typically includes log records that have been more recently written than the log records contained in the page log.

The storage system has a log recovery manager that recovers the log image following a failure. The log recovery manager first reads the log records from the page log. This reproduces a majority of the log image. The log recovery manager then attempts to full restore the log image by scanning the distributed log to locate any more recent log records that may exist. Once a more recent log record is found, the log recovery manager adds it to the recaptured log image and then proceeds to find even more recent log records.

To speed recovery, the log recovery manager intelligently begins the search at a location in the storage system that the next log record is likely to reside. More particularly, the log recovery manager begins looking for the next log record using three criteria: (1) it looks on the same storage medium that contains the previous log record just found; (2) it looks in the other staging buffer on the storage medium rather than the buffer containing the log record just found; and (3) it begins at an offset equal to the length of the log record just found. These three criteria significantly improve the recovery time.

DETAILED DESCRIPTION OF THE INVENTION

Figure 1:
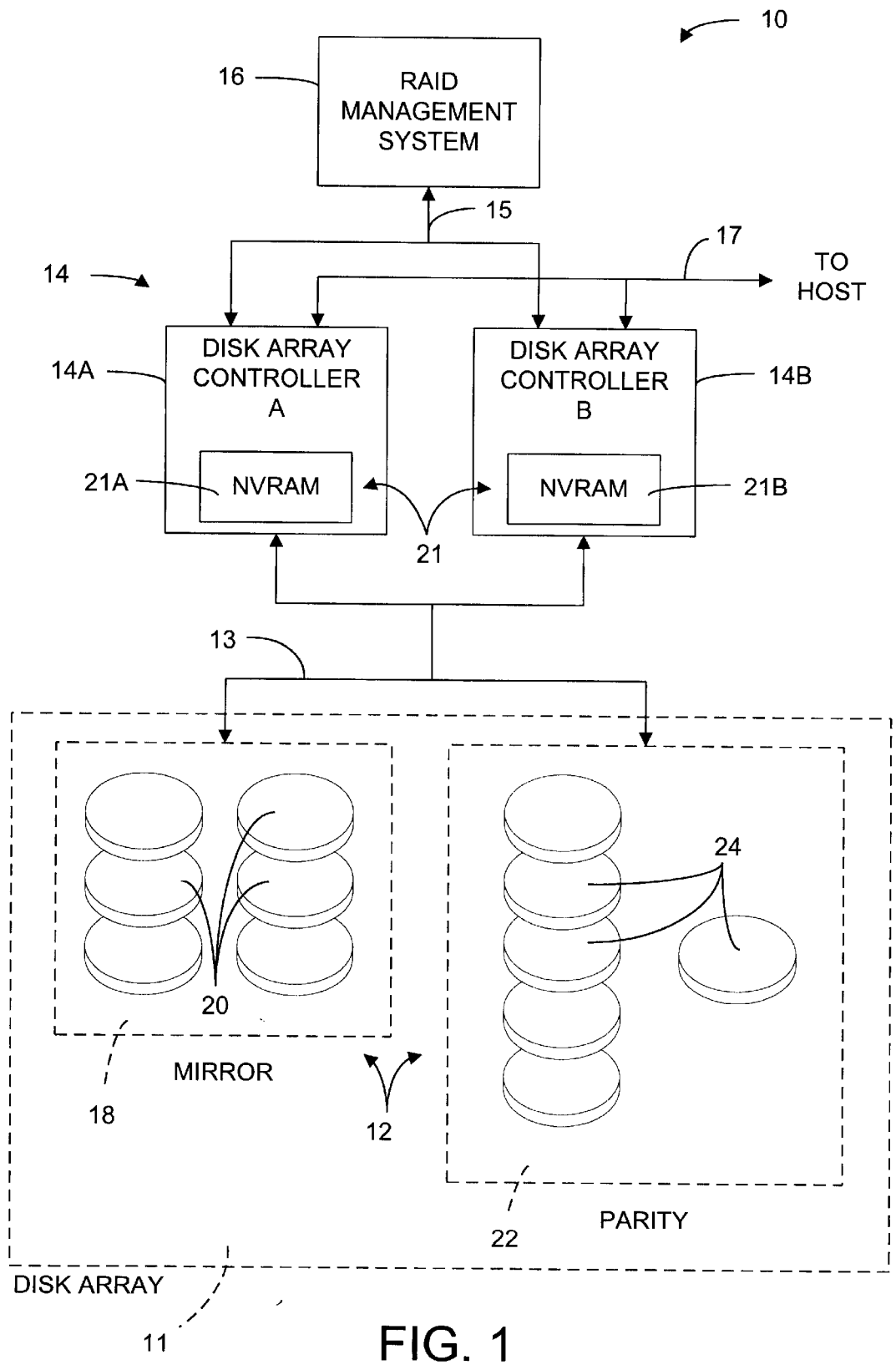
FIG. 1 is a block diagram of a disk array data storage system that implements a distributed write disk log and a log recovery method.

FIG. 1 shows a data storage system 10 embodied as a disk array data storage system that includes a hierarchic disk array 11. A non-hierarchic array (not shown) is equally applicable with the present invention. Disk array 11 includes a plurality of storage disks 12 for implementing a RAID (Redundant Array of Independent Disks) storage system. Data storage system 10 includes disk array controller 14 coupled to the disk array 11 to coordinate data transfer to and from the storage disks 12, and further includes RAID management system 16. RAID management system 16 includes means for effectuating a distributed write disk log.

For purposes of this disclosure, a "disk" is any non-volatile, randomly accessible, rewritable mass storage device that has the ability of detecting its own storage failures. It includes both rotating magnetic and optical disks and solid-state disks, or non-volatile electronic storage elements (such as PROMs, EPROMs, and EEPROMs). The term "disk array" is a collection of disks, the hardware required to connect them to one or more host computers, and management software used to control the operation of the physical disks and present them as one or more virtual disks to the host operating environment. A "virtual disk" is an abstract entity realized in the disk array by the management software.

The term "RAID" means a disk array in which part of the physical storage capacity is used to store redundant information about user data stored on the remainder of the storage capacity. The redundant information enables regeneration of user data in the event that one of the array's member disks or the access path to it fails. A more detailed discussion of RAID systems is found in a book entitled, *The RAIDBook: A Source Book for RAID Technology*, published Jun. 9, 1993, by the RAID Advisory Board, Lino Lakes, Minn. Although a RAID system is exemplified in connection with the present invention, it is obvious that a non-RAID system is also equally applicable.

Disk array controller 14 is coupled to disk array 11 via one or more interface buses 13, such as a small computer system interface (SCSI). RAID management system 16 is operatively coupled to disk array controller 14 via an interface protocol 15. It should be noted that RAID management system 16 can be embodied as a separate component as shown (i.e., as software or firmware), or configured within disk array controller 14 or within the host computer. The RAID management system 16 provides a data manager means for controlling disk storage and reliability levels, for transferring data among various reliability storage levels. The RAID management system 16 also implements distributed write disk logging. Data storage system 10 is also coupled to a host computer (not shown) via an I/O interface bus 17.

In the system shown, disk array controller 14 is implemented as a dual controller consisting of disk array controller "A" 14A and disk array controller "B" 14B. Dual controllers 14A and 14B enhance reliability by providing continuous backup and redundancy in the event that one controller becomes inoperable. However, the methods of this invention can be practiced with a single controller or other architectures. In fact, the present invention may be particularly useful in a single controller architecture where the need for maintaining a complete and accurate disk log is even more critical than in the dual controller environment.

The hierarchic disk array 11 can be characterized as different storage spaces, including its physical storage space and one or more virtual storage spaces. For example, storage disks 12 in disk array 11 can be conceptualized as being arranged in a mirror group 18 of multiple disks 20 and a parity group 22 of multiple disks 24. These various views of storage are related through mapping techniques. For example, the physical storage space of the disk array can be mapped into a virtual storage space that delineates storage areas according to the various data reliability levels. Some areas within the virtual storage space can be allocated for a first reliability storage level, such as mirror or RAID level 1, and other areas can be allocated for a second reliability storage level, such as parity or RAID level 5. These areas may be configured on the same or separate disks or any combination thereof.

Data storage system 10 includes a memory map store 21 that provides for persistent storage of the virtual mapping information used to map disk array 11. The memory map store is external to the disk array, and preferably resident in the disk array controller 14. The memory mapping information can be continually or periodically updated by the controller 14 or RAID management system 16 as the various mapping configurations among the different views change.

Preferably, the memory map store 21 is embodied as two non-volatile random access memories (NVRAMs) 21A and 21B which are located in respective controllers 14A and 14B. The dual NVRAMs 21A and 21B provide for redundant storage of the memory mapping information. The virtual mapping information is duplicated and stored in both NVRAMs 21A and 21B according to mirror redundancy techniques. In this manner, NVRAM 21A can be dedicated to storing the original mapping information and NVRAM 21B can be dedicated to storing the redundant mapping information.

As indicated, disk array 11 has multiple storage disk drive devices 12. The management of redundancy on devices 12 is coordinated by RAID management system 16. When viewed by the user or host application program, an application-level virtual view can represent a single large storage capacity indicative of the available storage space on storage disks 12. RAID management system 16 can dynamically alter the configuration of the RAID areas over the physical storage space. As a result, the mapping of the RAID areas in a RAID-level virtual view onto the disks and the mapping of a front end virtual view to the RAID view are generally in a state of change. The memory map store in NVRAMs 21A and 21B maintains the current mapping information used by RAID management system 16 to map the RAID areas onto the disks, as well as the information employed to map between the two virtual views. As the RAID management system dynamically alters the RAID level mappings, it also updates the mapping information in the memory map store to reflect the alterations.

However, regardless of the RAID scheme or data storage scheme employed in a disk array, it is clear that the memory map 21 is generally in a constant state of change throughout system use. Thus, memory map log records are maintained and constantly posted from memory to disk by RAID management system 16 to ensure recovery of the same in the event of a loss of NVRAMs 21.

The RAID management system 16 maintains a distributed log among the multiple disks 12. The log consists of multiple log records stored on various ones of the disks. One logging technique involves distributing the log records to any least busy disk selected from across the multiple available disks 12. Selecting the least busy disk reduces contention for disk accesses between log I/Os and other I/Os in progress. The selection is accomplished by reserving a "staging log" area on each disk 12 for retention of the most recent portion of the log. Then, if a request to post occurs prior to a page of the transaction log memory being full, the posting occurs immediately to the reserved "staging log" area of whichever disk is the least busy. Subsequently, when log recovery is required, fragments from all the disks 12 are collapsed into a single complete image.

Distributed Log

Figure 2:
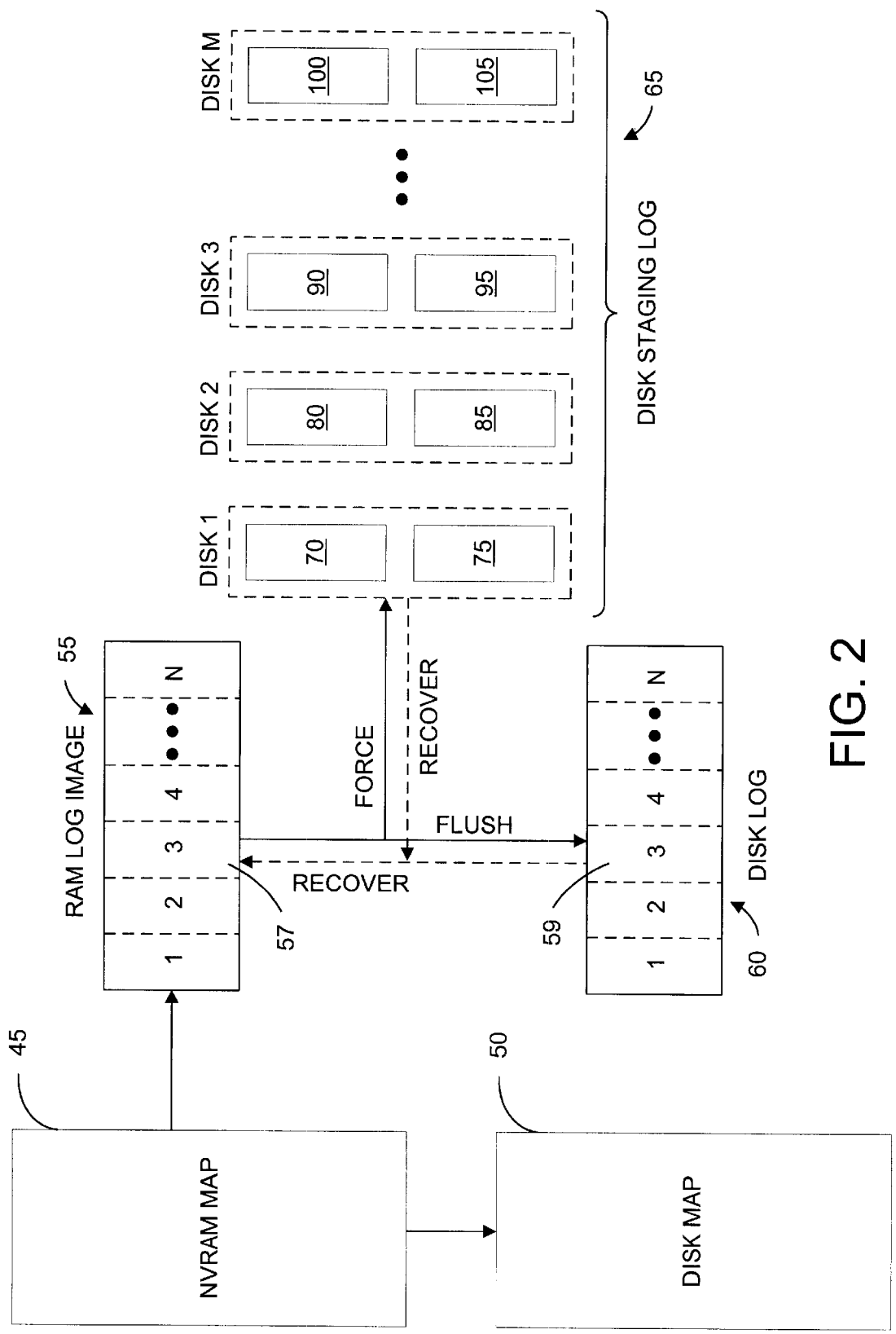
FIG. 2 is a block diagram showing transaction logging using distributed log writes.

FIG. 2 shows a distributed log stored partly in the non-volatile memory 21 and partly across the multiple disks 12 in the disk array 11. NVRAM map 45 represents a subset of non-volatile memory 21 on controllers 14A/14B (FIG. 1) in which data is stored for use in connection with disk storage system 10. Disk map 50 resides on disk array 11 and is a conventional disk map image of NVRAM map 45. The disk map 50 may further be redundantly stored on the disk array 11 according to the RAID scheme used to store the map.

The NVRAM map 45 is regularly posted to disk map 50 to provide a redundant copy of the contents of NVRAM map 45 on disk for fault recovery purposes. Generally, posting the NVRAM map 45 to disk map 50 occurs as a background process (as controlled by RAID management system 16) when normal system processing and I/O contentions allow. As such, posting the NVRAM map to disk map 50 is subject to normal system contentions for I/O access and disk space and therefore, bears an element of uncertainty regarding when posting will actually occur.

A RAM log image (RLI) 55 is kept in a subset of memory 21, or on a separate memory (preferably non-volatile). RLI 55 is used for quickly storing/recording incremental changes that occur in NVRAM map 45. In an exemplary implementation, RLI 55 includes sixteen (shown as N) addressable 64 K byte pages, although other configurations are feasible.

The incremental changes stored in RLI 55 are subsequently posted to a disk log 60 or a disk staging log 65 when requested to do so by RAID management system 16. The disk log 60 resides on array 11 (FIG. 1) and is a conventional disk image of RLI 55. The disk log 60 is capable of storing multiple pages of log records, similar to RLI 55. As shown, disk log 60 is labeled with N pages for storing log records and as conventional in the art, may be contiguous or circularly linked. Disk log 60 is stored and managed on disk array 11 using normal data redundancy schemes of disk storage system 10 (of FIG. 1).

The disk staging log 65 is a distributed log that is distributed across the disks 12 in the disk array 11. More specifically, the disks have a reserved area consisting of reserved staging areas or buffers 70, 75, 80, 85, 90, 95, 100 and 105 (referred to as 70–105) formed on parts of the disks 12 of disk array 11 (FIG. 1).

Several factors may cause RAID management system 16 to initiate a request to post data from RLI 55 to disk log 60 or disk staging log 65. The RAID management system 16 issues a "flush" posting request when the RAM log image detects a page-full status. The flush request causes a full page of the transaction log to be written from RLI 55 to disk log 60. Alternatively, the RAID management system 16 issues a "force" posting request to write one or more log records of transaction log data from RLI 55 to disk staging log 65. The force posting request is issued in response to (i) a time-based frequency requirement, or (ii) a specific host request. The log records are written out in one or more blocks and include records from the current page that were not previously written and any additional transaction log records that have not been written.

The page that is flushed to disk log 60 and the blocks that are forced to disk staging log 65 are referred to as "unwritten" data of RLI 55. It is noted that a flush written page may contain some records that were previously force written to staging log 65. Such postings (either to disk log 60 or disk staging log 65) insure that changes in NVRAM map 45 (as caught in RLI 55) are stored to disk array 11 for recovery in the event of system failure. A flush posting of the unwritten contents of RLI 55 to disk map 60 occurs under normal I/O circumstances and is subject to system I/O contentions for disk access and space. Although disk log 60 is generally updated more often than disk map 50, it only retains the incremental changes to NVRAM map 45 (as caught in RLI 55) whereas disk map 50 retains a complete image of NVRAM map 45 (as of the last update).

As noted above, disk staging log 65 is used to store the contents of RLI 55 upon specified events or times other than a "page-full" status. However, this criterion for posting is flexible with system design changes and/or user override considerations as would be obvious to those of ordinary skill in the art. In any case, when a specified event occurs (other than a "page-full" status) as requested by RAID management system 16, RLI 55 "force" posts its "unwritten" contents to any one of the disks 1–M of disk staging log 65, which ever disk is the least busy. A least busy disk is detected by monitoring I/O activity of disks 1–M of array 11.

In essence, a force of RLI 55 to the least busy disk effectuates a distributed write of the transaction log across the disk array over time. This is in contrast to a page-full "flush" of RLI 55 to a given, single disk log 60. Although disk log 60 may actually be spread out over multiple disks in the event a parity redundancy scheme is used, it is in essence a "single" or "non distributed" disk log because only one base address is needed/used on a single disk drive in order to address/access the entire log (not considering any redundant copy).

Advantageously, a "force" posting occurs with reduced I/O contention (relative to other ongoing system read/write I/O activity) because the least busy disk is selected. Thus, unlike posting to disk map 50 or disk log 60, this distributed write posting to disk staging log 65 is generally assured immediate (or at least quicker) completion. Additionally, a "force" posting is generally quicker than a "flush" posting because only a minimum number of unwritten blocks are transferred.

In contrast to disk log 60, disk staging log 65 retains the incremental changes noted in RLI 55 in a distributed, non-redundant fashion across disk array 11. It is non-redundant because the writes that occur to disk staging log 65 are excepted from the normal redundancy schemes of RAID management system 16. Thus, at least one less I/O step occurs in posting to disk staging log 65 relative to disk log 60. Redundancy is maintained after a "force" posting by the fact that the transaction log remains with the first memory in addition to being copied to the staging log area.

In one embodiment, each disk 1–M in array 11 has a dedicated amount of space reserved for storing the distributed log. As illustrated in FIG. 2, two 64 K byte buffers 70/75, 80/85, 90/95 and 100/105 are reserved on each disk. At least two pages are reserved on each disk to avoid potential overwriting of (and loss of) valid data in the event of some failure during the disk staging log posting process. Specifically, RLI 55 writes (posts/forces) to pages in disk staging log 65 in an alternating (swapping or toggling)

even/odd manner. For example, upon a first write, RLI 55 may post to an even numbered reserved buffer 70, 80, 90 or 100 on whichever disk is least busy. Then, upon a next write, RLI 55 posts to the odd numbered buffer 75, 85, 95 or 105 of whichever disk is the least busy. In this manner, the system is assured another level of data integrity and avoids a potential overwriting (i.e., in the event the same least busy disk is selected consecutively) of most recently posted data during a next consecutive posting that occurs.

Logging Using Distributed Writes

FIGS. 3–6 depict a portion of a page 57 of RLI 55 and a portion of each buffer 70–105 of disk staging log 65 to illustrate exemplary distributed write disk staging activities. Specifically, FIGS. 3–6 show different snapshots in time of the status of disk staging log 65 in response to separate postings from RLI 55. Page 57 of RLI 55 and each staging log buffer 70–105 are shown as being divided (logically) into three 512 byte blocks (or sectors) B1, B2 and B3 by the dashed lines. For clarity and ease of discussion, only three blocks rather than all the blocks in each 64 K byte page are shown. Log image page 57 (of RLI 55) is referenced herein and on the diagram as "LI". In addition, each disk in disk staging log 65 is referenced as "D1" to "DM" respectively, and each of the dual pages reserved in each disk is referenced as "P1" or "P2" respectively. Accordingly, the third 512-byte block on the second page of the first disk is referenced as "D1P2B3".

Figure 3:
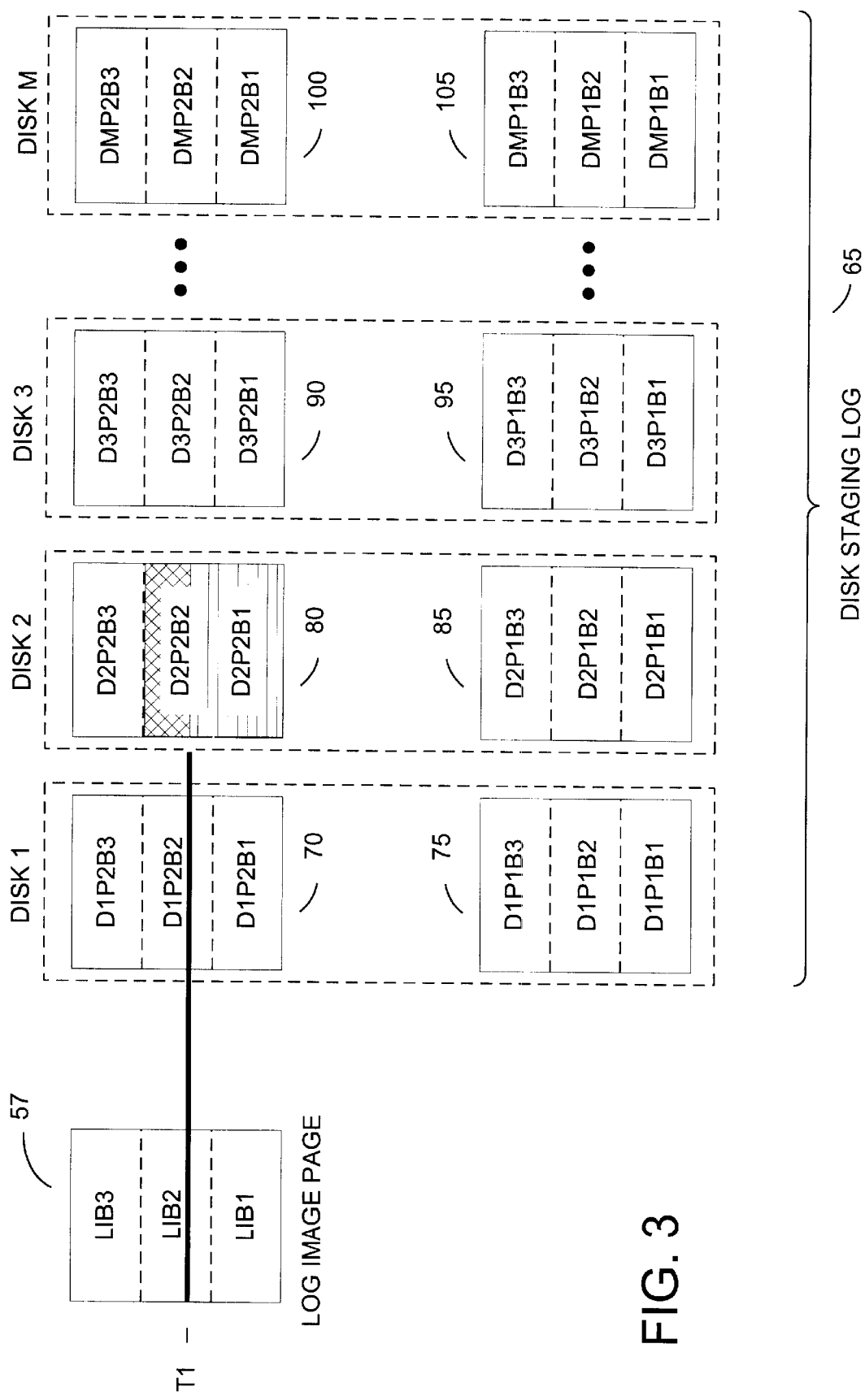
FIGS. 3–6 are block diagrams depicting a disk staging log at various snapshots in time.

In FIG. 3, logical marker T1 reflects a given point in time when a specified event occurs (as requested by RAID management system 16, FIG. 1) to initiate a "force" posting of the unwritten data of page 57 of RLI 55 to disk staging log 65. T1 further identifies a location that is indicative of how "full" RLI page 57 is with log data at that given point in time. When a posting is requested, full blocks of unwritten data in page 57 of RLI 55 are posted as identified by logical marker T1. Full blocks are posted since a 512-byte block of data is the minimal posting size (per arbitrary system design requirements in this example).

Thus, upon the occurrence of event/time T1, RLI 55 posts its unwritten contents in page 57 as referenced by location T1 to one of the disk staging areas 70–105 of the least busy disk 1–M of disk staging log 65. The data is posted in an alternating pattern that swaps back-and-forth between the odd and even pages on the disks. Specifically, block one of log image page 57 (LIB1) is posted in its entirety because it is unwritten and completely full. Block two of the log image (LIB2) is also unwritten and thus will also be posted in its entirety (even though log data only partially fills LIB2 at event/time T1). Suppose that disk 2 is detected as being the least busy and that posting will begin with an even page number in disk staging log 65. The block contents LIB1 and LIB2 of page 57 are posted to corresponding blocks B1 and B2 of page 80 (P2) of disk 2 of disk staging log 65 (i.e., D2P2B1 and D2P2B2). Block D2P2B1 thus contains all valid data (shown in reverse video horizontal line format), and block D2P2B2 contains partial valid data up to time/marker T1. The rest of block D2P2B2 contains invalid data, or "don't care" data (shown in cross hatch).

Figure 4:
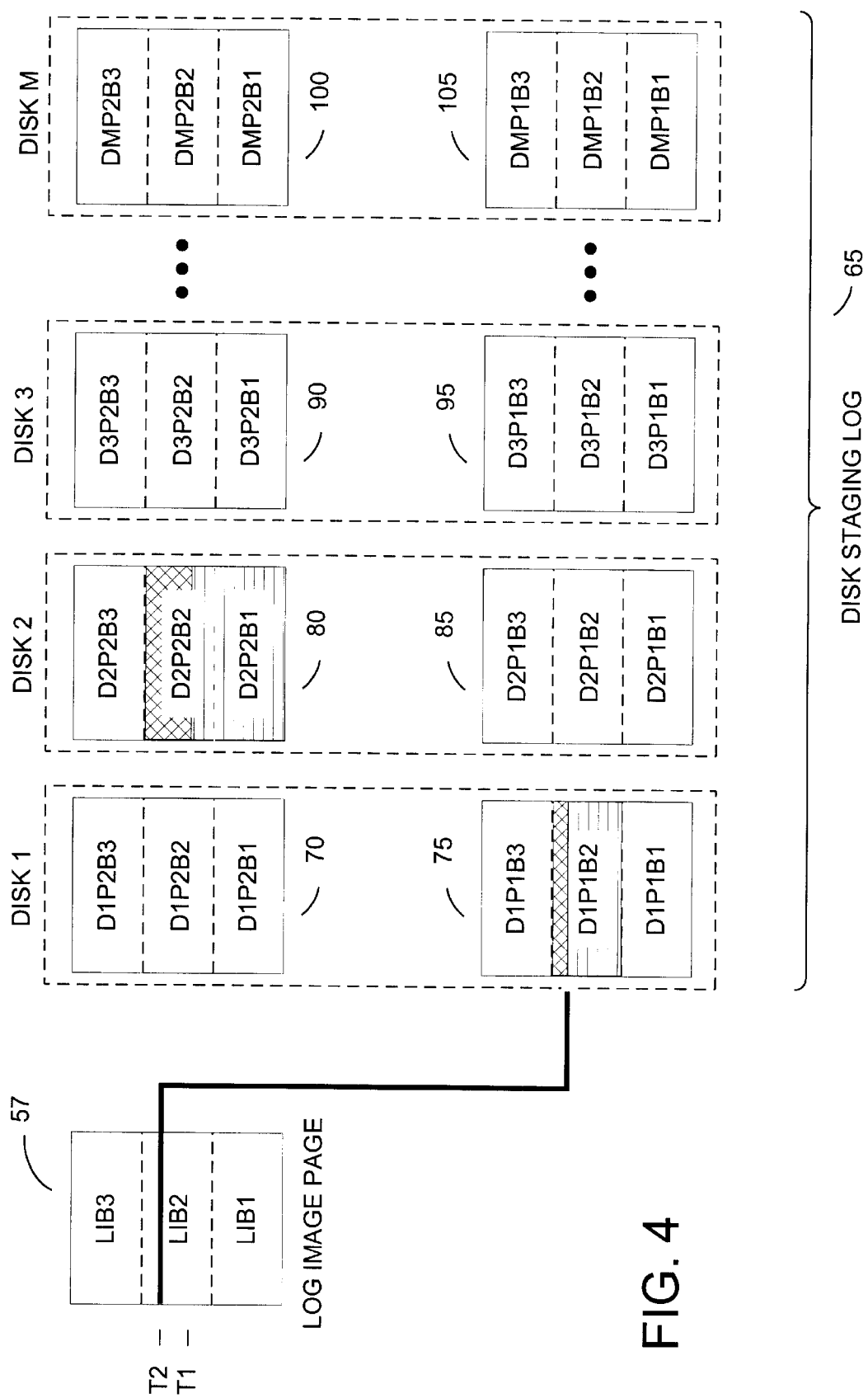

FIG. 4 shows a second event/time T2 that identifies where RAID management system 16 again requests that RLI 55 post its data. In this instance, the log image page 57 data stored between time T1 and T2 (i.e., the "unwritten" data) is posted to disk staging log 65 (since a page-full status was not yet achieved). (If, however, all of page 57 were filled with transaction data prior to event/time T2, RLI 55 would post the entire page 57 to disk log 60 rather than posting only a portion to disk staging log 65). Assuming that disk 1 is the least busy disk now and knowing that write I/O occurs only in full block sizes, all of LIB2 is written to D1P1B2. The odd page P1 (75) is written this time to accommodate a page "toggling" (swapping) data protection technique previously described. The invalid data (i.e., the data beyond the specified time marker T2 that is within the block size) is again shown in cross hatch.

Figure 5:
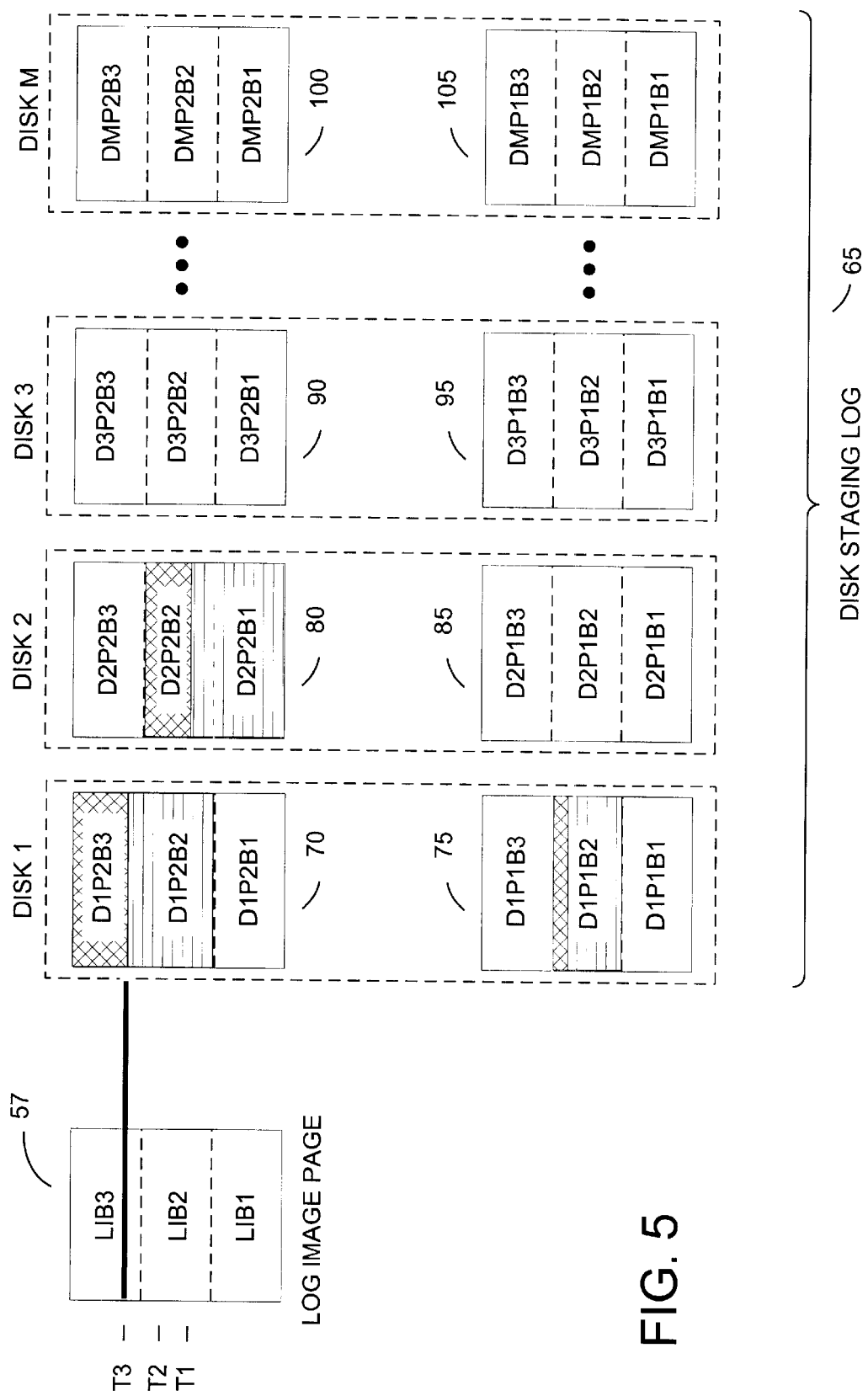

FIG. 5 shows a third event/time T3 wherein RLI 55 again is requested to post its data before a page-full status has been achieved. In this instance, the log image page 57 data stored between time T2 and T3 (the "unwritten" data) must be posted. Assuming in this instance that disk 1 (D1) is again the least busy, all of LIB2 is posted to D1P2B2, and all of LIB3 is posted to D1P2B3. Again, to accommodate page swapping, the "even" staging buffer P2 (70) is written this time.

Figure 6:
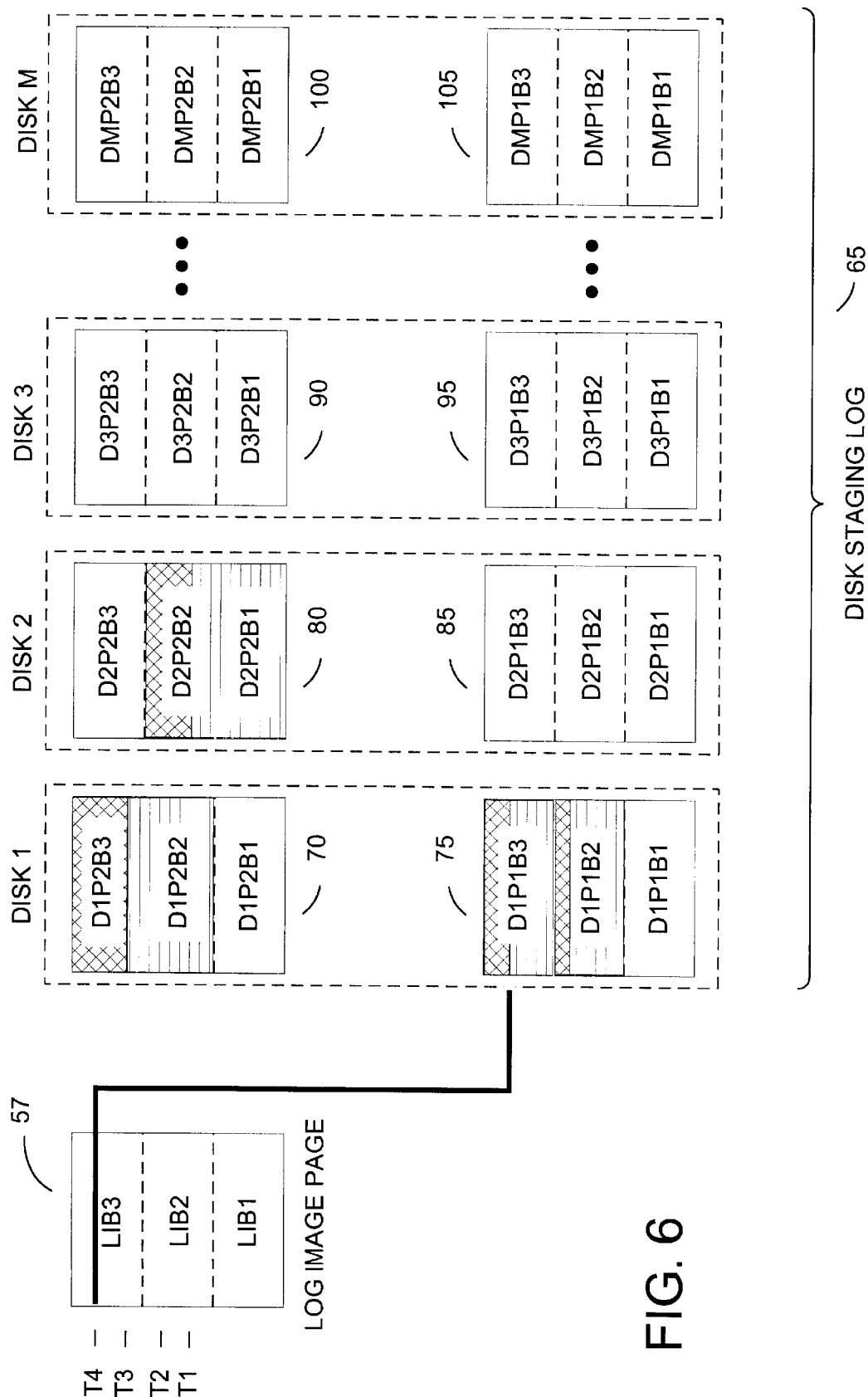

FIG. 6 shows a fourth event/time T4 wherein RLI 55 again is requested to post its data before a page-full status is achieved. In this instance, the "unwritten" log Image page 57 data stored between time T3 and T4 must be posted. Assuming that disk 1 is the least busy again, all of LIB3 is force posted to D1P1B3 in the "odd" staging buffer 75.

As can be seen with respect to FIGS. 3–6, overall system I/O performance impact is reduced because the least busy disk is written to and because no redundant writes to disk or disks occur. Redundancy is maintained by the fact that the log data is written on disk (disk staging log 65) and yet also remains in RLI 55. It should be noted once again that, in the described implementation, a "force" to disk staging log 65 occurs for events that occur prior to a page-full status for RLI 55 and a "flush" to disk log 60 occurs in the event a page-full status for RLI 55 is detected.

Figure 7:
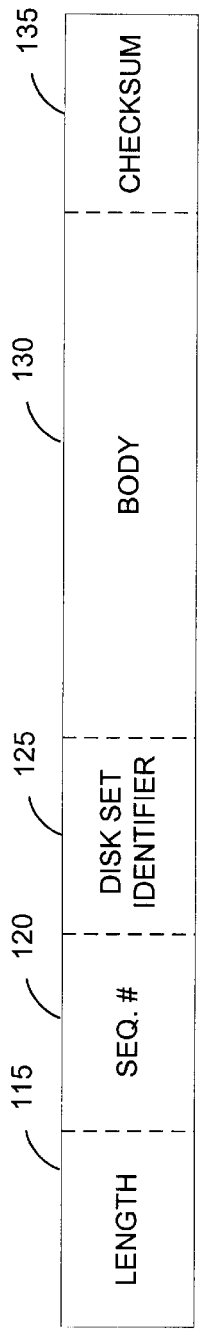
FIG. 7 is a block diagram of a data record.

FIG. 7 shows a log record 110 used in connection with the distributed writing. Each 512-byte block (sector) of data in RLI 55 (and disk log 60 and disk staging log 65) comprises one or more records 110, and a record 110 may cross block boundaries. The record 110 has a header, a body, and a footer, and for illustration purposes, is shown in simplified form in that not all fields are depicted that may be used with the record.

Record 110 includes in the header a length indicator 115 for identifying the record length and a sequence number 120 for identifying sequencing of records for restoring the data from disk staging log 65. The sequence number 120 is a generated number that is monotonically incremented for each new record added to the transaction log.

The record header also has a disk set identifier 125 for identifying the disk set associated with the transaction log. The disk set identifier 125 is an arbitrary identifier of the current instance of the disk set that is associated with RLI 55, and is used to insure that "stale" (i.e., invalid) staging log 65 data is not used during transaction log recovery. Namely, during recovery, a record is recognized as valid if its disk set identifier 125 matches the current instance of the disk set. The record is recognized as invalid if its disk set identifier 125 does not match the current instance of the disk set. A stale record or records may occur, for example, if a disk drive is swapped in from another disk set. If so, the disk set identifier associated with each record enables the transaction log recovery process to recognize and not use any stale data associated with that new disk. Simply put, the record's disk set identifier must match the current disk set instance.

The log record 110 further includes a body 130 that is appended to the header to hold the actual log data being stored. A checksum 135 computed from the whole record is appended as a footer and is used to validate the status of the record during transaction log recovery.

Figure 8:
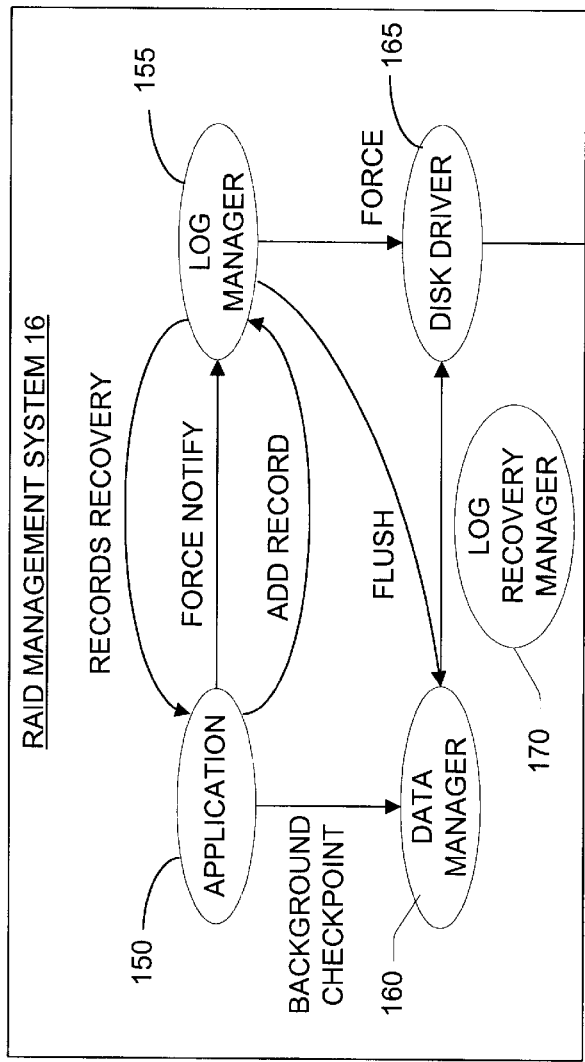
FIG. 8 is a block diagram of functional components employed in the logging and recovery process and shows process flow for the distributed write disk log.

FIG. 8 depicts the interrelation of processes embodied within RAID management system 16 for managing log transactions. These processes may be implemented in software, hardware, and/or firmware. The processes are implemented in a number of components, including an application 150, a log manager 155, a data manager 160, a disk driver 165, and a log recovery manager 170. When an application 150 manipulates the NVRAM map 45 (FIG. 2), a record 110 identifying the activity is created and the log manager 155 is notified to add the record to its control (as represented by the "ADD RECORD" control arrow). The log manager 155 stores the log record 110 in RAM log image 55 (FIG. 2).

Records are continually added until one of several key events occurs. In the event the current page in RLI 55 becomes full, the log manager 155 flushes the full page by transferring control to the data manager 160. This action is represented by the control arrow labeled "FLUSH". The data manager 160 then interfaces with disk driver 165 to redundantly post the full page contents to the disk log 60 of disk array 11. In the event the current page in RLI 55 is not full, but log manager 155 detects a force request to force a posting to the disk staging area 65 of array 11, the log manager 155 bypasses data manager 160 and interfaces directly with disk driver 165 as represented by the "FORCE" control arrow. No redundant copy is written after a "force" post occurs.

Recovery

Now, assume that the storage system 10 fails in some manner, for example, due to a power outage, a memory failure, or some other problem. After failure, the storage system 10 initiates a recovery process that utilizes the distributed log to recover the RAM log image and restore the system to the point of operation just prior to failure. The log recovery manager 170 implements the recovery process. One goal is to make recovery as fast and efficient as possible.

Figure 9:
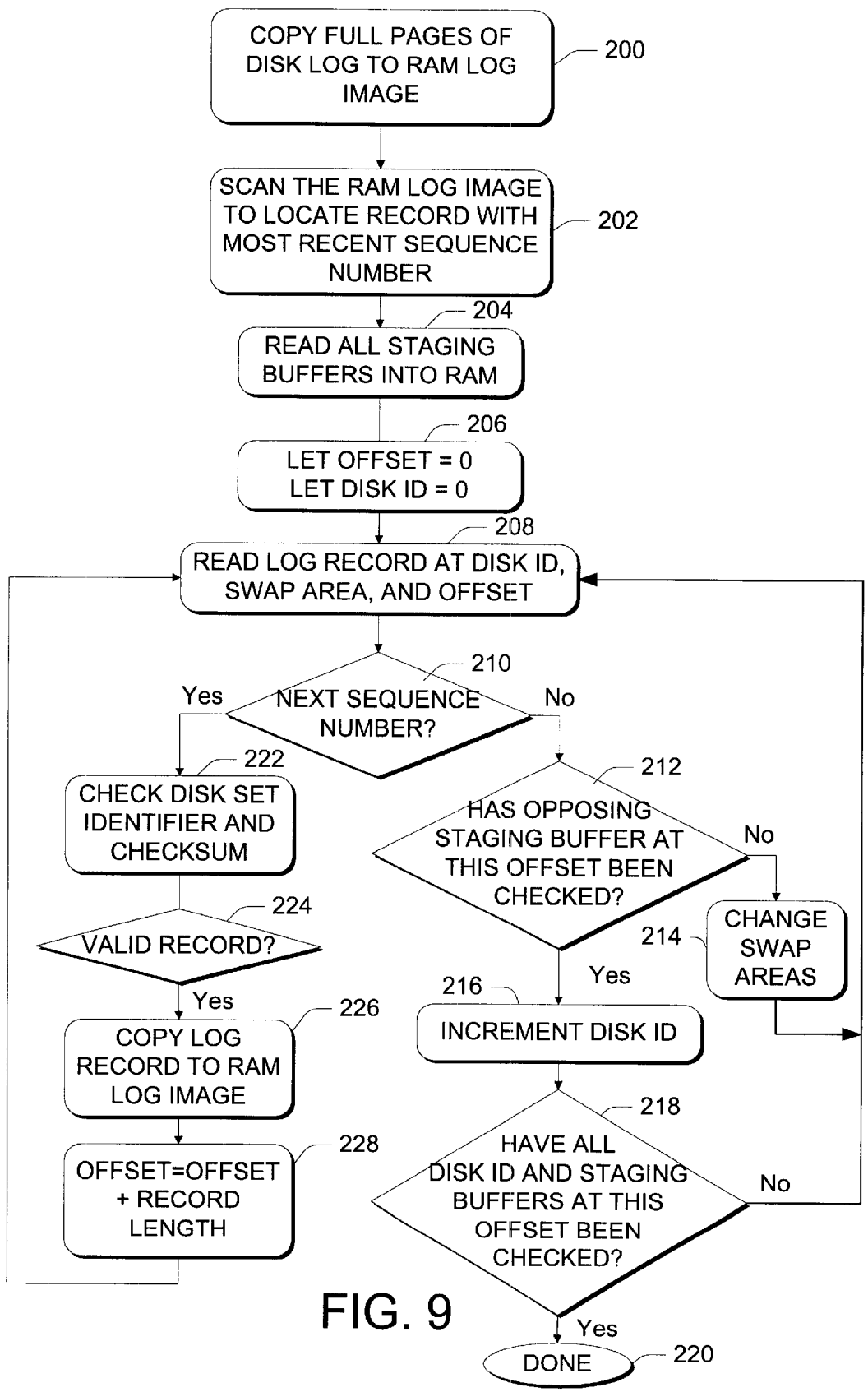
FIG. 9 is a flow diagram showing a process for recovering a log image following a system failure.

FIG. 9 shows the recovery process of recovering the incremental log records stored in disk log 60 and in disk staging log 65. Initially, at step 200, all full pages of disk log 60 are copied to RLI 55 to reconstruct as much of the log data as possible. This step reconstructs a significant portion of the RLI 55. However, a non-full page, such as page 59, may have data sitting in the disk staging log 65 that also needs to be copied to the RLI 55. Thus, the fragments of log data from all buffers 70–105 of disk staging log 65 on disks 115 M are also collapsed into a single complete image for copying to RLI 55.

In preparation for recovering the distributed log records from disk staging log 65, the log recovery manager 170 scans the RLI 55 to locate the record with a sequence number 120 indicative of the last (i.e., most recent) record written to disk log 60 (step 202). This scan accounts for both circularity of the log and wrapping of the sequence numbers.

Any log record with the next consecutive sequence number following the last one written to the disk log 60 is more recent and will be found, if one exists, in disk staging log 65. Accordingly, the log recovery manager 170 next scans the disk staging log 65 buffer-by-buffer to find the record having the next consecutive sequence number (being indicative of the next record to be restored to RLI 55). At step 204, the log recovery manager 170 reads all of the staging buffers 70–105 into the NVRAM 21.

Beginning at the start of one staging buffer (i.e., offset=0) on a first disk (DiskID=0), the log recovery manager 170 reads the log record contained in the buffer in a first swap area (steps 206 and 208). The log recovery manager checks the various components in the header, including the sequence number and the data length. The recovery manager 170 determines whether the sequence number for this record is the next sequence number (step 210). If not (i.e., the "no" branch from step 210), the log recovery manager 170 checks whether the opposing staging buffer has been checked (step 212). If it has not been checked (i.e., the "no" branch from step 212), the log recovery manager 170 changes to the opposing swap area (step 214) and reads the log record at the offset (i.e., offset=0 on first pass) in the opposing staging buffer area with the same disk ID. On the other hand, assuming the opposing swap area has been checked (i.e., the "yes" branch from step 212), the log recovery manager 170 increments the disk ID (i.e., DiskID =1) to advance the evaluation to the next disk (step 216). The recovery manager 170 then determines whether it has checked all of the disks and their corresponding buffers (step 218). If so (i.e., the "yes" branch from step 218), the process is completed (step 220). If this happens before the next log sequence number is found, the log recovery manager is assured that the disk log 60 already contained the most recent log record and the RAM log image is completely restored. Otherwise, the process continues at step 208 with the log recovery manager 170 reading the log record contained in the buffer staging area with the same disk ID.

According to the above process, the recovery manager 170 proceeds through the disk staging log 65 in an orderly manner by sequentially evaluating log records from the even and odd staging buffers on each disk in the array.

With reference again to step 210, assume that the log recovery manager 170 continues to read through the disks, swapping back and forth between swap areas, and finally locates the next log sequence number for the next log record in disk staging log 65 (i.e., the "yes" branch from step 210). The log recovery manager 170 checks the disk set identifier 125 to confirm that the record belongs to the current instance of the disk set and evaluates the record's checksum 135 to determine the integrity of the record (step 222). If the log record is not valid (i.e., the "no" branch from step 224), process continues at step 212 with a determination of whether the opposing staging buffer has been evaluated. Conversely, if the record is valid (i.e., the "yes" branch from step 226), the log record is copied to the RLI 55 to continue the transaction log recovery process (step 224). In the example of FIGS. 3–6, the first record in block D2P2B1 satisfies this first step recovery criteria.

Now that a more recent log record than the most recent record in the disk log 65 has been found, the log recovery manager determines if an even more recent log record exists. One technique is to simply scan the disk staging log 65 again for a next consecutive record that follows in incremental sequence number order. While this process is effective, aspects of this invention concern record parsing techniques that more effectively parses the log records in the distributed staging log 65 to locate the next log record. The parsing technique seeks to minimize the process of finding the next log record by intelligently starting the search at a location in the distributed staging log where the next log record is likely to reside. If the starting point proves unfruitful, the search continues as described above. However, by intelligently selecting a likely location of the next, a successful find significantly shortens the recovery process.

According to one parsing technique, the log recovery manager 170 first checks the very next log record following the one previously found to determine if the log record is part of a set of multiple consecutive log records that were stored concurrently in the same staging buffer. It is likely that multiple records may have been forced to the same staging buffer. Given the known length 115 of the previously found record, it is known that a next record, if any, will start at the offset described by the length 115 of the previously found record. The log recovery manager 170 moves to the next record in the buffer by moving an offset equal to the length of the log record found in the header (step 228).

The log recovery manager 170 reads the log record at the offset in the same staging buffer on the same disk (step 208), checking various components in the header such as the sequence number and the data length. If the sequence number for this record is the next in the sequence (i.e., the "yes" branch from step 210), the log recovery manager 170 checks the disk set identifier 125 and checksum 135 (step 222) and if valid, copies the log record to the RAM log image (step 226). The process then continues to the next record in the series by incrementing the offset (step 228).

In the example of FIGS. 3–6, the series of log records in blocks D2P2B1 and D2P2B2 satisfy these steps. Eventually, the series of contiguous log records runs out. One common case is when the end of buffer marker is found. This indicates that a string of records is completed and that the opposing buffer should be searched. It is typical that all current (non-persistent) records are forced out to the staging buffer. This is followed by an end of buffer marker. It's likely that there are quite a few end of buffer markers in the staging areas.

If the log recovery manager determines at step 210 that the log record is not the next most recent log record (i.e., the "no" branch from step 210), the log recovery manager 170 swaps to the opposing staging buffer. Notice that the offset and the disk ID remains the same and is not reset to zero to restart a search (steps 228 and 208).

Accordingly, the log recovery manager 170 intelligently looks for the next log record on the same disk in the array, but on the opposing even/odd staging buffer, and at an offset equal to the length of the previous log record. These three criteria—(1) same disk, (2) opposing staging buffer, (3) offset by record length—define the most likely location to find the next record. Thus, rather than starting all over at the first staging buffer of the first disk, the log recovery manager more intelligently selects the location in the disk staging log that satisfies these three criteria.

Following steps 212 and 214, the log recovery manager 170 reads the log record in the opposing even or odd staging buffer on the same disk (step 208). In our continuing example, where the previous log record is found in staging buffer 80 on disk 2, the log recovery manager 170 reads in the staging buffer 85 on disk 2 as being the most likely location to find the next log record. The log recover manager 170 reads the log record from the staging buffer that resides at the current offset determined at step 228. The log recovery manager continues the process described above to evaluate whether this log record is the record with the next sequence number.

At this time, no efficiency was gained, as the next log record is not located in staging buffer 85. However, consider the situation when the log recovery manager locates the log records in block D1P1B2 on staging buffer 75 of disk 1. After the next log record is located, the log recovery manager 170 reads in the opposing staging buffer 70 on disk 1 as being the most likely location to find the next log record (step 232). The log recover manager 170 reads the log record from the staging buffer that resides at the current offset of the most recent log record (step 208). In this case, the next log record is indeed found in block D1P2B2 as a result of the force write at time T3 (FIG. 5).

After the series of log records in block D1P2B2 and D1P2B3 are copied into the RAM image log, the log recovery manager 170 selects the opposing staging buffer 75 on disk 1 as the most likely location to find the next log record. The log recover manager 170 reads the log record from the staging buffer 75 that resides at the current offset of the most recent log record (step 208). In this case, the next log record is found in block D1P1B3 as a result of the force write at time T4 (FIG. 6).

The process is repeated throughout staging log 65 until all records that satisfy each of these recovery criteria are recovered.

For the illustrated examples, log recovery for disk log 60 and disk staging log 65 is now complete to RLI 55. The log recovery manager 170 has copied the entire disk log 60 and has recaptured the more recent records from the distributed disk staging log 65. The log recovery manager is thus assured that it has recovered the RAM log image to the point just prior to the failure. As such, referring again to FIG. 8, the log recovery manager 170 returns control to the log manager 155. The log manager passes the recovered records (now found in RLI 55) back to the control of application 150 (RAID management System 16, FIG. 1) indicating that log recovery is complete. Application 150 may now proceed to effectuate the log changes noted in RLI 55 in order to place NVRAM map 45 back in a state that existed prior to the system error/failure that initiated the transaction log recovery process.

What has been described above are the preferred embodiments of a method and apparatus for improving disk log write performance using distributed write operations across multiple disks in a disk array. It will be obvious to one of ordinary skill in the art that the present invention is easily implemented utilizing any of a variety of software, firmware and/or hardware components existing in the art. Moreover, while the present invention has been described by reference to specific embodiments, it will be apparent that other alternative embodiments and methods of implementation or modification may be employed without departing from the true spirit and scope of the invention.

What is claimed is:

1. A method of recovering a storage system having multiple storage media following a failure, wherein the storage system maintains a log image having first log records kept in a first log and second log records kept in a second distributed log that is distributed over the storage media, the method comprising:

reading the first log records of the first log to reproduce a part of the log image; and scanning the distributed log to locate any second log records to reproduce a remainder of the log image.

2. The method of claim 1 wherein the scanning comprises initially selecting a storage medium that is most likely to contain a second log record.

3. A method of recovering a storage system having multiple storage media following a failure, wherein the storage system maintains a log image having first log records kept in a first log and second log records kept in a second distributed log that is distributed over the storage media, the method comprising:

reading the first log records of the first log to reproduce a part of the log image; and scanning the distributed log to locate any second log records to reproduce a remainder of the log image;

wherein the first and second log records are assigned sequence numbers and the scanning comprises determining a most recent first log record in the first log and searching the distributed log to locate a next log record from among the second log records that has a more recent sequence number than that of the first log record.

4. The method of claim 3 wherein upon finding the next log record, further comprising commencing a search to look for a subsequent log record having a next sequence number at a storage medium that contains the log record just found.

5. The method of claim 3 wherein the second log records are originally stored in the distributed log by alternating between two possible storage buffers on each of the storage media and upon finding the next log record in one staging buffer of a particular storage medium, further comprising commencing a search to look for a subsequent log record having a next sequence number at the particular storage medium, but in the other staging buffer on the particular storage medium.

6. In a storage system that maintains a log image having first log records kept in a first log and second log records kept in a distributed log that is distributed over the storage media, wherein each of the storage media includes a reserved area that form the distributed log, each of the reserved areas having at least two staging buffers that are alternately written to and wherein the first and second log records are assigned sequence numbers, a method of recovering the log image following a failure, comprising:

reading the first log records of the first log to reproduce a part of the log image;

scanning the first log records to locate a most recent log record having a most recent sequence number from among the sequence numbers assigned to the first log records;

reading individual ones of the staging buffers;

incrementally selecting ones of the second log records stored in the staging buffers;

evaluating whether a selected one of the second log records is a next log record having a next sequence number that follows from the most recent sequence number associated with the most recent log record among the first log records; and upon locating the next log record on a particular storage media, commencing a search to look for a subsequent log record with a next sequence number on the particular storage media that contains the log record just found, but in the other staging buffer on the particular storage medium.

7. The method of claim 6 wherein the commencing comprises beginning the search at an offset into the other staging buffer that is equal to or greater than a length of the log record just found.

8. A storage system comprising:

a memory to hold a log image having multiple log records, the log records having associated sequence numbers that indicate a temporal order among the log records;

multiple storage media connected to the memory, each of the storage media having a reserved area that defines at least two staging buffers;

a page log stored on the storage media, the page log containing one or more pages of the log records from the log image;

a distributed log distributed over the storage media and residing in the staging buffers, the distributed log containing log records that are occasionally written to one of the storage media in an alternating pattern between the two staging buffers, wherein the log records in the distributed log may include more recent log records that have been more recently written to the log image than the log records contained in the page log; and a log recovery manager to recover the log image following a failure, the log recovery manager reading the log records from the page log to reproduce a part of the log image and subsequently scanning the distributed log to locate any more recent log records to reproduce a remainder of the log image.

9. The storage system of claim 8 wherein the log recovery manager, prior to beginning the scanning, selects a storage medium from among the storage media that is most likely to contain a more recent log record.

10. The storage system of claim 8 wherein the log recovery manager determines a most recent log record in the page log and searches the distributed log to locate a next log record that has a more recent sequence number.

11. The storage system of claim 8 wherein the log recovery manager, upon finding the next log record, initiates a search to look for a next log record with a next most recent sequence number on the storage medium that contains the next log record just found.

12. The storage system of claim 8 wherein the log recovery manager, upon finding the next log record, initiates a search to look for subsequent log record with a next log record with a next most recent sequence number on the storage medium that contains the next log record just found, but in another staging buffer on the storage medium.

13. A RAID storage system comprising the storage system of claim 8.

14. In a storage system that maintains a log image having first log records kept in a first log and second log records kept in a distributed log that is distributed over the storage media, wherein each of the storage media includes a reserved area that form the distributed log, each of the reserved areas having at least two staging buffers that are alternately written to and wherein the first and second log records are assigned sequence numbers, a computer-readable storage medium comprising computer-executable instructions for:

reading the first log records of the first log to reproduce a part of the log image;

scanning the first log records to locate a most recent log record having a most recent sequence number from among the sequence numbers assigned to the first log records;

reading individual ones of the staging buffers;

incrementally selecting ones of the second log records stored in the staging buffers;

evaluating whether a selected one of the second log records is a next log record having a next sequence number that follows from the most recent sequence number associated with the most recent log record among the first log records; and upon locating the next log record on a particular storage media, commencing a search to look for a subsequent log record with a next sequence number on the particular storage media that contains the log record just found, but in the other staging buffer on the particular storage medium.

15. The computer-readable storage medium of claim 14 further comprising computer-executable instructions for beginning the search at an offset into the other staging buffer that is equal to or greater than a length of the log record just found.

* * * * *